(12) United States Patent
Balachandran et al.

(10) Patent No.: US 7,224,465 B2
(45) Date of Patent: May 29, 2007

(54) FIBER TIP BASED SENSOR SYSTEM FOR MEASUREMENTS OF PRESSURE GRADIENT, AIR PARTICLE VELOCITY AND ACOUSTIC INTENSITY

(75) Inventors: Balakumar Balachandran, Rockville, MD (US); Moustafa Al-Bassyiouni, Greenbelt, MD (US); Miao Yu, Boyds, MD (US)

(73) Assignee: University of Maryland, College Park, MD (US)

( * ) Notice: Subject to any disclaimer, the term of this patent is extended or adjusted under 35 U.S.C. 154(b) by 149 days.

(21) Appl. No.: 11/038,093

(22) Filed: Jan. 21, 2005

(65) Prior Publication Data
US 2005/0146726 A1 Jul. 7, 2005

Related U.S. Application Data

(63) Continuation-in-part of application No. 10/270,277, filed on Oct. 15, 2002, now Pat. No. 6,901,176.

(60) Provisional application No. 60/569,297, filed on May 7, 2004.

(51) Int. Cl.
*G01B 9/02* (2006.01)
(52) U.S. Cl. .................. 356/480; 356/519; 385/12
(58) Field of Classification Search ............... 356/478, 356/480, 519, 477, 506; 385/12
See application file for complete search history.

(56) References Cited
U.S. PATENT DOCUMENTS

| | | | |
|---|---|---|---|
| 4,329,058 A | 5/1982 | James et al. | |
| 4,682,500 A | 7/1987 | Uda | |
| 4,755,668 A | 7/1988 | Davis | |
| 4,873,989 A | 10/1989 | Einzig | |
| 4,926,696 A * | 5/1990 | Haritonidis et al. | .......... 73/705 |
| 5,218,420 A | 6/1993 | Asmar | |
| 5,381,229 A | 1/1995 | Murphy et al. | |
| 5,392,117 A | 2/1995 | Belleville et al. | |
| 5,408,319 A | 4/1995 | Halbout et al. | |
| 5,459,571 A | 10/1995 | Dammann et al. | |
| 5,907,403 A | 5/1999 | Andrews et al. | |
| 6,008,898 A | 12/1999 | Furstenau et al. | |
| 6,281,976 B1 | 8/2001 | Taylor et al. | |

(Continued)

OTHER PUBLICATIONS

A. Sampath, et al., "Active Control of Multiple Tones Transmitted in an Enclosure", Journal of the Acoustical Society of America, vol. 106, No. 1, pp. 211-225, Jul. 1999.

(Continued)

Primary Examiner—Hwa (Andrew) Lee
(74) Attorney, Agent, or Firm—Rosenberg, Klein & Lee

(57) ABSTRACT

A fiber optic sensor system for pressure measurements where the design permits multiplexity on the input side of the system and the optical part of the system, which has a sensor Fabry-Perot interferometer and a read-out interferometer, is based on low coherence fiber-optic interferometry techniques. This permits a high dynamic range and low sensitivity to the wavelength fluctuation of the light source as well as to the optical intensity fluctuations. The system includes fiber tip based Fabry-Perot sensors, where each sensor includes a diaphragm as the transducer. A combined pressure gradient sensor, air particle velocity sensor, as well as acoustic intensity sensor is built based on the fiber tip based Fabry-Perot sensors.

22 Claims, 7 Drawing Sheets

U.S. PATENT DOCUMENTS

| | | |
|---|---|---|
| 6,738,145 B2 | 5/2004 | Sherrer et al. |
| 6,925,213 B2 | 8/2005 | Boyd et al. |
| 2003/0112443 A1 | 6/2003 | Hjeime et al. |
| 2003/0169956 A1 | 9/2003 | Lange et al. |
| 2004/0047536 A1 | 3/2004 | Pickrell et al. |

OTHER PUBLICATIONS

M. Al-Bassyiouni, et al., "Zero Spillover Control of Enclosed Sound Fields", SPIE's Annual International Symposium of Smart Structures and Materials, Newport Beach, CA, Mar. 4-8, vol. 4362, Paper No. 4326-7, 2001.

M. Al-Bassylouni, et al., "Experiment Studies of Zero Spillover Scheme for Active Structural Acoustic Control Systems", Proceedings of the 12th International Conference on Adaptive Structures and Technologies (ICAST), University of Maryland, College Park, MD, Oct. 15-17, 2001.

Bucaro J.A., et al., "Fiber Optic Hydrophone", Journal of Acoustical Society of America, 62, pp. 1302-1304, 1977.

Cole, J.H., et al., "Fiber Optic Detection of Sound", Journal of Acoustic Society of America, 62, pp. 1136-1138, 1977.

Baldwin, et al., "Bragg Grating Based Fabry-Perot Sensor System for Acoustic Measurements", Proceedings of the SPIE 1999 Symposium on Smart Structures and Materials, Newport Beach, CA, Mar. 1-5, 1999.

J.W. Parkins, "Active Minimization of Energy Density in a Three-Dimensional Enclosure", Ph.D. Dissertation. Pennsylvania State University, 1998.

L.E. Kinsler, et al., "Fundamentals of Acoustics", Second Edition, John Wiley & Sons, Inc., New York, 1962.

B. Balachandran and M. X. Zhao, "Actuator nonlinearities in interior acoustics control," in Proceedings of SPIE Smart Structures and Materials 2000: Mathematics and Control in Smart Structures, pp. 101-109, Mar. 2000.

C. Hess, "Optical microphone for the detection of hidden helicopters", AIAA Journal, vol. 30, No. 11, pp. 2626-2631, Nov. 1992.

G. He, et al., "The analysis of noises in a fiber optic microphone", J. Acoust. Soc. Am., 92 (5), pp. 2521-2526, Nov. 1992.

C. Zhou, et al., "Fiber-optic microphone based on a combination of a Fabry-Perot interferometry and intensity modulation", J. Acoust. Soc. Am., 98 (2), Pt. 1, pp. 1042-1045, Aug. 1995.

D. Li, et al., "The ring-type all-fiber Fabry-Perot interferometer hydrophone system", J. Acoust. Soc. Am., 104 (5), pp. 2798-2806, Nov. 1998.

C. Koch, "Measurement of ultrasonic pressure by heterodyne interferometry with a fiber-tip sensor", Applied Optics, vol. 38, No. 13, pp. 2812-2819, May 1, 1999.

P. Beard, et al., "Characterization of a Polymer Film Optical Fiber Hydrophone for Use in the Range 1 to 20 MHz: A Comparison with PVDF Needle and Membrane Hydrophones", IEEE Transactions on Ultrasonics, Ferroelectrics, and Frequency Control, vol. 47, No. 1, pp. 256-264, Jan. 2000.

R. Claus, et a., Editors, "Sensory Phenomena and Measurement Instrumentation for Smart Structures and Materials", Proceedings of SPIE, Mar. 1-4, 1999 Newport Beach, California, vol. 3670, pp. 342-351, 1999.

M. Yu, et al., "Fiber Tip Based Fiber Optic Acoustic Sensors", Twelfth International Conference on Adaptive Structures, Eds. N. Wereley, et al., CRC Press, 245-254, 2001.

* cited by examiner

SENSOR INTERFEROMETER: FABRY-PEROT SENSOR

REFERENCE INTERFEROMETER: MACH-ZEHNDER INTERFEROMETER

WHEN PATH MATCHED : Ls=Lr

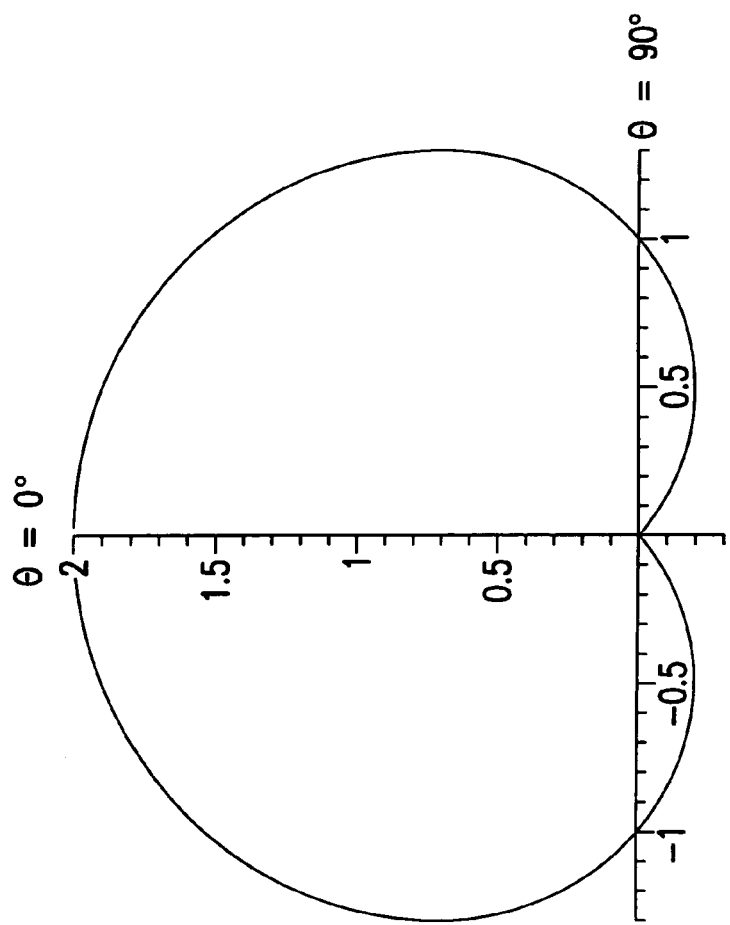
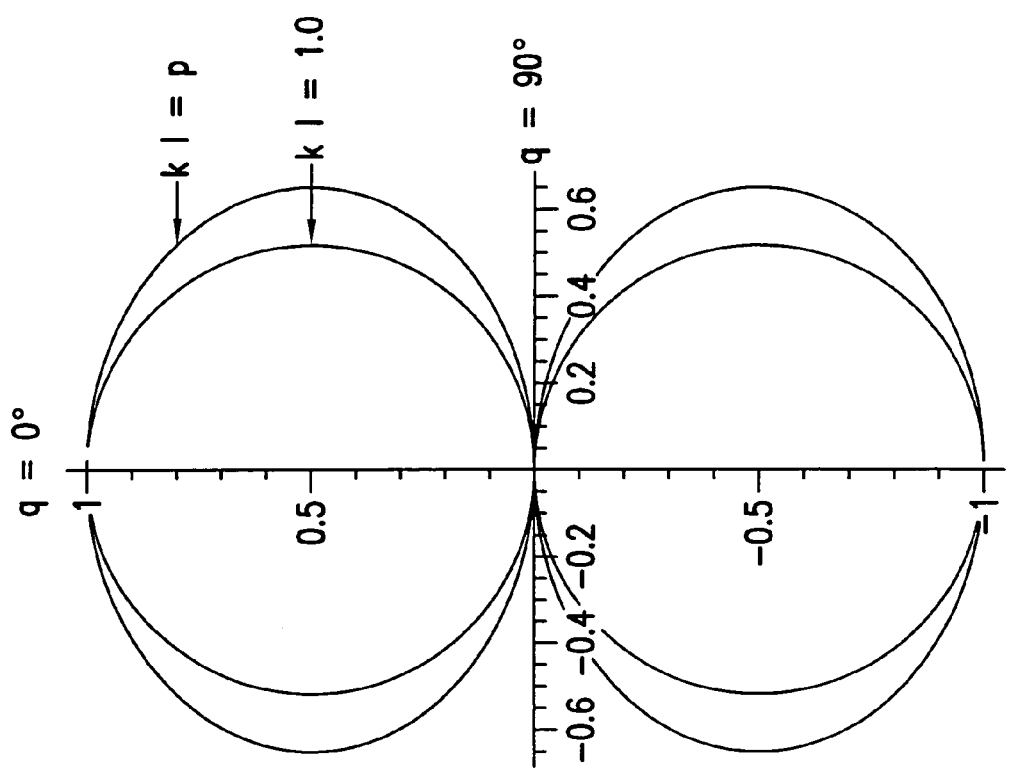
FIG.8B
FIG.8A

US 7,224,465 B2

FIBER TIP BASED SENSOR SYSTEM FOR MEASUREMENTS OF PRESSURE GRADIENT, AIR PARTICLE VELOCITY AND ACOUSTIC INTENSITY

REFERENCE TO RELATED APPLICATIONS

This Utility Patent Application is based on a Provisional Patent Application No. 60/569,297 filed May 7, 2004, and is a Continuation-in-Part of the Utility patent application Ser. No. 10/270,277 filed 15 Oct. 2002 now U.S. Pat. No. 6,901,176.

FIELD OF THE INVENTION

The present invention relates to measurement systems, and in particular to fiber tip based optic sensor systems for active acoustics and vibration control, permitting measurements of various acoustic parameters.

More in particular, the present invention relates to fiber tip based low-finesse Fabry-Perot sensor system for pressure gradient, air particle velocity and acoustic intensity measurements.

BACKGROUND OF THE INVENTION

In the design of modern transportation vehicles, structural vibration and interior noise have become important problem areas that must be addressed. For example, in helicopter systems, control of sound transmission into enclosed spaces is an important issue. Various studies have shown that the predominant frequency components associated with the noise transmission lie in the frequency range of 50 Hz to 5500 Hz. There are various approaches that may be used to minimize sound within a helicopter cabin.

One approach, which is based on controlling the radiation (transmission) from (through) a flexible structure by active means, is referred to as Active Structural Acoustic Control (ASAC). The ASAC scheme, which is an effective solution for low frequency applications, takes advantage of vibrating structural elements as secondary noise sources to cancel the sound fields generated by a primary noise source (A. Sampath, et al., "Active Control of Multiple Tones Transmitted in an Enclosure", Journal of the Acoustical Society of America, Vol. 106, No. 1, Pages 211-225, July 1999; M. Al-Bassyiouni, et al., "Zero Spillover Control of Enclosed Sound Fields", SPIE's Annual International Symposium of Smart Structures and Materials, Newport Beach, Calif., March 4-8, Vol. 4362, Paper No. 4326-7, 2001; and, M. Al-Bassyiouni, et al., "Experimental Studies of Zero Spillover Scheme for Active Structural Acoustic Control Systems", Proceedings of the 12$^{th}$ International Conference on Adaptive Structures and Technologies (ICAST), University of Maryland, College Park, Md., Oct. 15-17, 2001). It appears that ASAC schemes require much less dimensionality than Active Noise Control (ANC) schemes in order to realize widely distributed spatial noise reduction. As known in the art, ANC schemes are generally used to minimize noise by using various cancellation techniques. However, active research is still being pursued to address issues such as sensors, actuators, and control architecture.

Fiber-optic sensors have the advantages of being lightweight, having high sensitivity, and provide simplicity in multiplexing. Demonstrations have showed that optical fibers may be used as acoustic sensors (Bucaro J. A., et al., "Fiber Optic Hydrophone", Journal of Acoustical Society of America, 62, Pages 1302-1304, 1977; and, Cole, J. H., et al., "Fiber Optic Detection of Sound", Journal of Acoustic Society of America, 62, Pages 1136-1138, 1977). Much of the research in this area has been directed towards the development of hydrophones for ultrasonic detection which does not suit the needs of an ASAC system.

Since Bragg grating sensors were shown to be multiplexible by using Wavelength Division Multiplexing (WDM) techniques, Baldwin, et al., ("Bragg Grating Based Fabry-Perot Sensor System for Acoustic Measurements", Proceedings of the SPIE 1999 Symposium on Smart Structures and Materials, Newport Beach, Calif., Mar. 1-5, 1999), developed a Bragg grating based Fabry-Perot sensor system for use in ASAC schemes. However, the sensor bandwidth was found to be limited, and in addition, the sensor was found to have low sensitivity due to the high Young's modules of silica resulting in "acoustically induced strains" which also limit the application of this type of sensors.

Thus, low finesse Fabry-Perot sensors have become attractive choices for high performance sensing in this area. As shown in the prior art, a Fabry-Perot optical sensing device for measuring a physical parameter, described in U.S. Pat. No. 5,392,117 comprises a Fabry-Perot interferometer through which a multiple frequency light signal having predetermined spectral characteristics is passed. The system further includes an optical focusing device for focusing at least a portion of the light signal going outwards from the Fabry-Perot interferometer and a Fizeau interferometer through which the focused light signal is passed.

The Fabry-Perot interferometer includes a pair of semi-reflecting mirrors substantially parallel to one another and spaced apart so as to define a Fabry-Perot cavity having transmittance or reflectance properties that are effected by a physical parameter such as pressure, temperature, refractive index of a liquid, etc., which causes the spectral properties of the light signal to vary in response to changes in physical parameters.

The Fabry-Perot interferometer is provided with at least one optical fiber for transmitting the light signal into the Fabry-Perot cavity for collecting the portion of the light signal being transmitted outwards. The Fizeau interferometer includes an optical wedge forming a wedge-profile Fizeau cavity from which exits a spatially-spread light signal indicative of the transmittance or reflectance properties of the Fabry-Perot interferometer.

Of particular interest are sensor configurations that may be used for various acoustic measurements, such as measurement of sound pressure gradients, air particle velocity, and acoustic intensity. Currently, there are no commercially available fiber optic sensor systems which may be used for these measurements since the current technology is primarily based on condenser microphones.

Velocity sensors have numerous advantages, some of which are as follows: (1) better sensitivity to spherical waves compared to the sensitivity of a pressure microphone; (2) can be used along with the pressure microphones to measure the sound energy density; and (3) can be used along with pressure microphones to develop a unidirectional microphone that would favor waves incident from only one direction and discriminate waves incident from other directions.

The concept of a typical velocity microphone is known in the prior art. However, complexity and bulkiness of known velocity microphones makes them difficult to use effectively in ASAC systems. A conventional arrangement of a velocity microphone consists of a corrugated metallic ribbon suspended between the N and S magnetic pole pieces and freely acceptable to acoustic pressures on both sides (L. E. Kinsler, et al., "Fundamentals of Acoustics", Second Edition, John Wiley & Sons, Inc., New York, 1962).

The ribbon acts as a short light cylinder that may be easily displaced in one direction under a force generated by air pressure. A velocity sensor was proposed (J. W. Parkins, "Active Minimization of Energy Density in a Three-Dimensional Enclosure", Ph.D. Dissertation, Pennsylvania State University, 1998) which consists of six pressure condenser microphones mounted on a sphere of radius of 1.0 inch.

A finite difference scheme was used to predict the air particle velocity from the pressure measurement. Although the size of the sensor was "small" compared to many commercially available velocity probes, it was shown that such a sensor could lead to errors if there is any mismatching between the different pressure microphones.

There may also be the potential for interference, since a plurality of microphones are generally housed together in a small volume. This interference may significantly affect the sensor signal-to-noise ratio, especially at low sound pressure levels. It is thus clear that a velocity sensor free of the disadvantages of prior art velocity sensors is needed in industry.

A new technology has been introduced recently by Microflown, a Dutch company, which allows for small scale air particle velocity sensors. However, these sensors are dependent on thermal effects, and therefore, operate at very high temperatures.

Summarizing the discussion of the prior art supra, it is readily understood to those skilled in the art that there is needed a wide bandwidth (in the frequency range of 50 Hz to 7.5 KHz) fiber tip based Fabry-Perot sensor systems for (acoustic) pressure measurements, which is free of the disadvantages of the prior art acoustical measurement systems, and which is capable of serving as a pressure gradient sensor, a velocity sensor, and an acoustic intensity sensor, and further is electrically passive and considerably smaller in size than the sensor systems based on condenser microphones.

SUMMARY OF THE INVENTION

It is an object of the present invention to provide a miniature, interference-free fiber tip based sensor system for pressure measurements that may be used to detect acoustic and vibration fields in a broad frequency range.

It is another object of the present invention to provide fiber tip based Fabry-Perot sensor systems for active acoustic control where fiber tip sensors are designed for acoustic pressure gradient, air particle velocity, and acoustic intensity measurements.

According to the teachings of the present invention, a fiber-optic sensor system is designed for the measurement of pressure gradient, air particle velocity, and acoustic intensity of an acoustic field within or external to an enclosure. The fiber-optic sensor system includes one or more pairs of substantially identical sensors and a processor for calculating the pressure gradient, air particle velocity, and acoustic intensity based on output from pairs of sensors.

Each sensor includes a diaphragm and a sensing fiber-tip based interferometer which has a Fabry-Perot cavity formed between the fiber tip and the diaphragm. The fiber tip and the diaphragm are both optically reflective to form a pair of reflective surfaces of the interferometer. The sensors of each pair, which are aligned along a single axis, are directed in the same direction towards the acoustical field to be measured.

For a 1D measurement, the sensor system would include one pair of sensors, while for 2D measurements two pairs of identical sensors will be utilized. Similarly, for 3D measurements, the number of pairs of the sensors increase to three. For the 3D measurements of acoustic field, six sensors are arranged on the surface of a spherically shaped supporting member. In a multi-pair fiber-optic sensor system, each pair of sensors is positioned in angular relationship (preferably normal) with respect to an axis of another pair of the sensors.

The processor calculates pressure gradient, air particle velocity, and acoustic intensity of the acoustic field based on the deflection of the diaphragm of each sensor subjected to the acoustic disturbance.

The processor calculates the pressure gradient in accordance with the formula:

$$\text{Pressure Gradient} = \frac{p(l/2, t) - p(-l/2, t)}{l}$$

where $p(\pm l/2, t)$ is the dynamic sound pressure to be sensed by the sensors at respective locations $l/2$ and $-l/2$ thereof, $l$ is the distance between the sensors, and t is the time of taking the measurement.

The processing means further calculates the air particle velocity as $$u(0, t) = \frac{1}{3}\left[4u(0, t - \delta t) - u(0, t - 2\delta t) - \frac{2\delta t}{\rho_0 l}[p(l/2, t) - p(-l/2, t)]\right]$$

where $\delta t$ is the time interval between two measurements and $\rho_0$ is the medium mass density.

After determining the pressure gradient and the air particle velocity at the center point between the sensors, the acoustic intensity is obtained from the following relation:

$$I(0,t) = p(0,t) \cdot u(0,t),$$

where $p(0,t)$ is the sound pressure, and $u(0,t)$ is the air particle velocity calculated by the processor.

The fiber-optic sensor system of the present invention further includes a light source which may be in the form of a superluminescent light emitting diode array, an integrated optical circuit (IOC), which can be used to modulate the light beam by using a multi-step phase stepping algorithm, a read-out interferometer built-in the IOC phase modulator where the read-out interferometer is path-matched to the sensing interferometer of each of the plurality of the sensors, and a plurality of photodetectors. Each of the photodetectors is coupled to a corresponding sensor. The outputs of the photodetectors are connected to a data acquisition mechanism which may include a 12-bit National Instruments Digital Acquisition Board (or an equivalent one or one with a higher precision) capable of being triggered to record the intensity (output of each photodetector) every $\pi/2$ radians of the modulation signal.

Phase modulation-demodulation units are coupled to the IOC phase modulator and the plurality of photodetectors for modulating the light beam in the IOC phase modulator in accordance with a multi-step phase-stepping pattern. Demodulation data is obtained from the plurality of the photodetectors in synchronism with the multi-step phase-stepping modulation pattern.

The modulation signal is a discrete sawtooth wave generated from the digital-to-analog output of the processor, which may be a personal computer. In every period of the modulation signal, four digital voltages are generated and used to drive four step modulated phase values from the IOC phase modulator based on the calibration curve. The modulated phases are then added to the sensor phase change. The combined phase signal is detected by the high speed photodetector and sent to the analog-to-digital input of a personal computer.

On the demodulation side of the phase modulation-demodulation mechanism, the optical intensity output from the photodetectors is sampled four times during each period of the modulation signal. The data acquisition mechanism records the intensity every $\pi/2$ radians of the modulation signal.

The sensor (optical) phase is then determined by the processor from these four intensity values. The pressure of the acoustic excitation is determined based on the obtained sensor phase.

Preferably, the read-out interferometer is a Mach-Zehnder interferometer. All connections between the fiber tip based Fabry-Perot sensors, photodetectors, and the IOC phase modulator are through optical couplers.

In each sensor, the fiber tip is coated with a $TiO_2$ film or polished appropriately to make a partial mirror for the Fabry-Perot cavity of the sensing interferometer.

The diaphragm is formed of a Mylar™, a polyester film, of preferably annular shape with the thickness approximating 40 microns and a radius of approximately 1.75 mm. Sensors with radii up to 3.5 mm have been designed by the Applicants. The distance between the fiber tip and the diaphragm can be adjusted and preferably is in the range of approximately 60 microns.

The present invention also represents a method for measuring a pressure gradient, air particle velocity, and acoustic intensity of an acoustic field. This method includes the following steps:
 aligning a pair of substantially identical sensors along a single axis and directing these sensors towards the acoustical disturbance to be sensed;
 coupling a processor to the pair of the sensors, and
 calculating pressure, pressure gradient, air particle velocity, and acoustic intensity based on the outputs from the pairs of sensors. Each sensor includes a diaphragm and a sensing fiber-tip based interferometer which has a Fabry-Perot cavity formed between the fiber tip and the diaphragm. The fiber tip and the diaphragm are both optically reflective to form a pair of reflective surfaces of the interferometer. The measurements and calculations are based on the deflection of a diaphragm subjected to the acoustic disturbance.

For 2D and 3D measurements, the method further includes the steps of arranging a plurality of pairs of such sensors in angled relative dispositions with respect to each other, preferably arranged in a manner that the pairs of sensors are normal to each other.

Such a sensing unit is positioned on the input end of the measurement system. In this system, the measurements are performed by:
 generating a light beam from a light source,
 modulating the light beam generated from the light source by an integrated optical circuit (IOC) phase modulator coupled thereto,
 coupling a photodetector to each of the sensors in the system,
 coupling a phase modulation-demodulation mechanism to the IOC phase modulator and a pair of the photodetectors,
 modulating the light beam in the IOC phase modulator by the modulation-demodulation mechanism in accordance with a multi-step phase stepping pattern, and
 demodulating data obtained from the pair of the photodetectors in synchronism with the multi-step phase stepping pattern.

The processing mechanism controls the modulation-demodulation unit and calculates phase signals of the pair (or a plurality of pairs) of the sensors based on the obtained data.

These and other novel features and advantages of this invention will be fully understood from the following detailed description of the accompanying Drawings.

BRIEF DESCRIPTION OF THE DRAWINGS

FIGS. 8A and 8B are the directional sensitivity diagrams of a 1-D pressure gradient sensor of the present invention and of a directional microphone, respectively.

DETAILED DESCRIPTION OF THE PREFERRED EMBODIMENTS

Figure 1A:
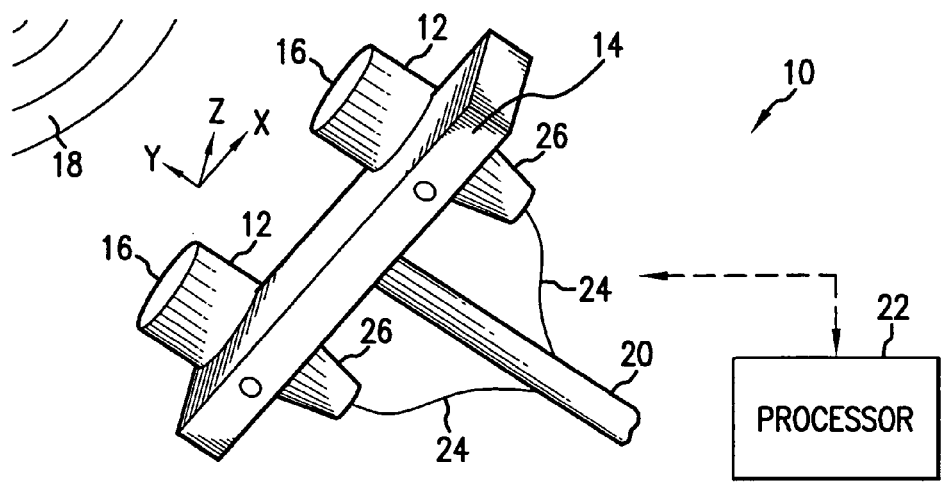
FIGS. 1A, 2A, and 3A are perspective views of 1-dimensional, 2-dimensional, and 3-dimensional pressure gradient sensors of the present invention, respectively.
Figure 1B:
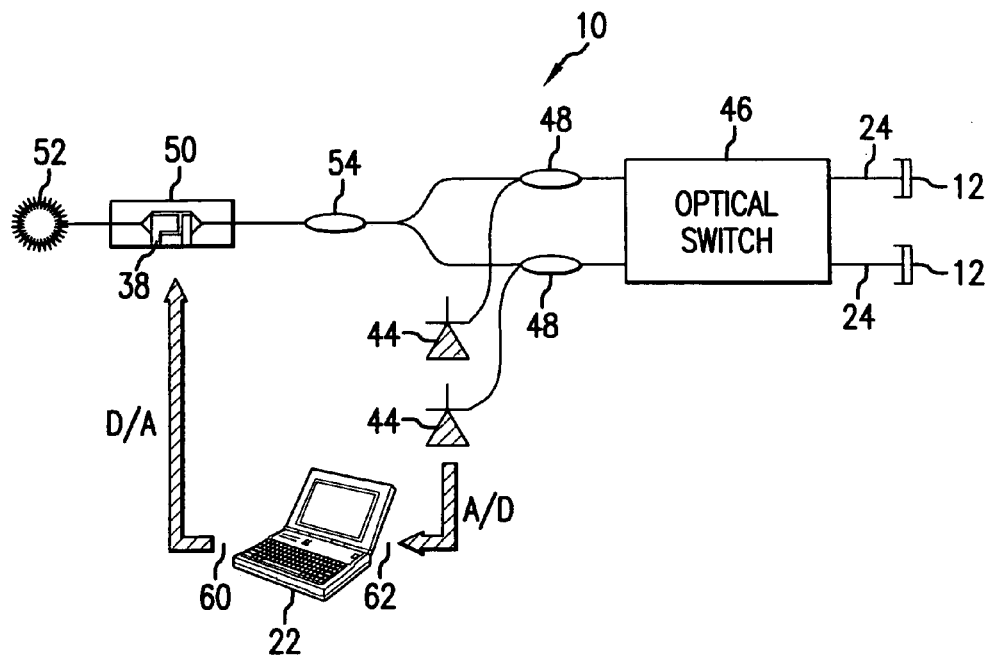
FIGS. 1B, 2B, and 3B are schematic representations of the sensor system of the present invention for 1-dimensional, 2-dimensional, and 3-dimensional measurements, respectively.
Figure 2A:
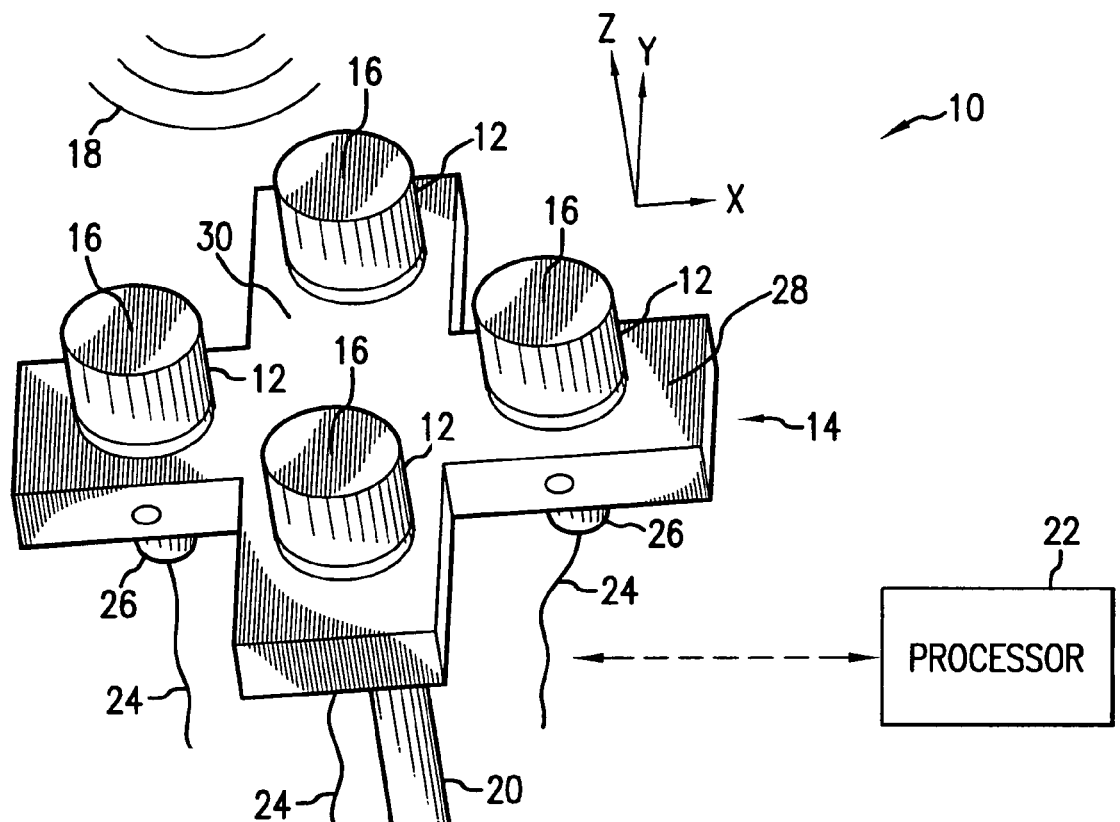
Figure 2B:
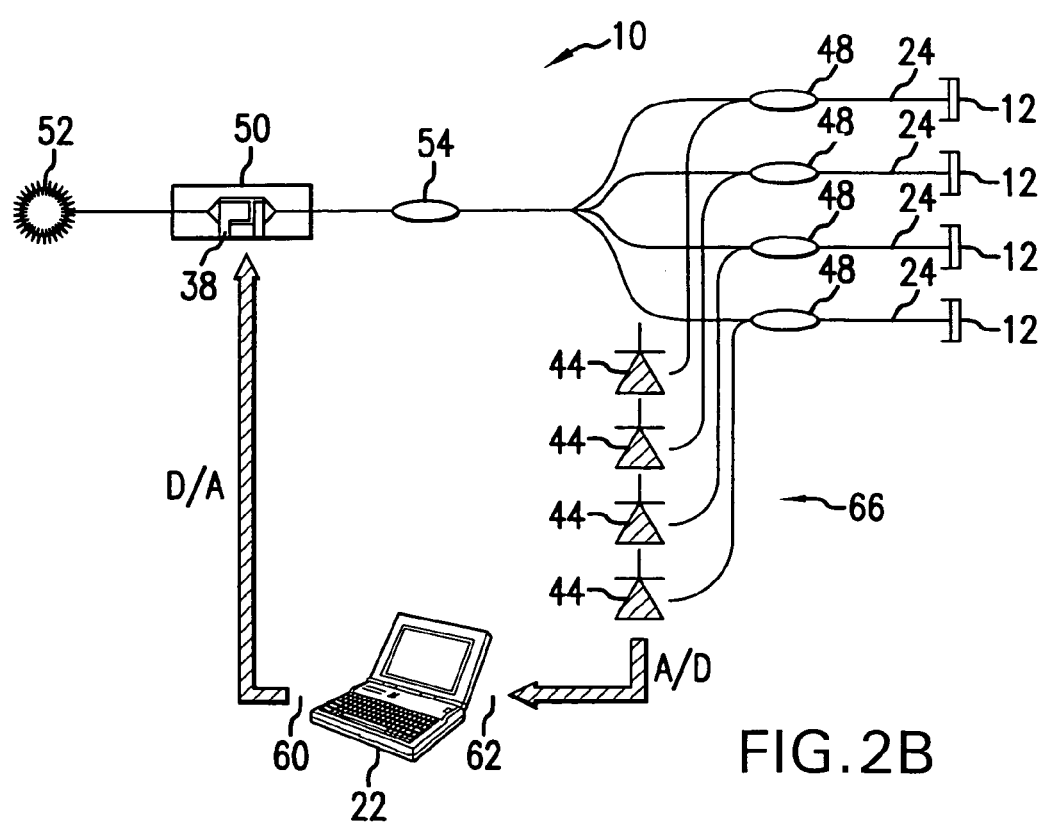
Figure 3A:
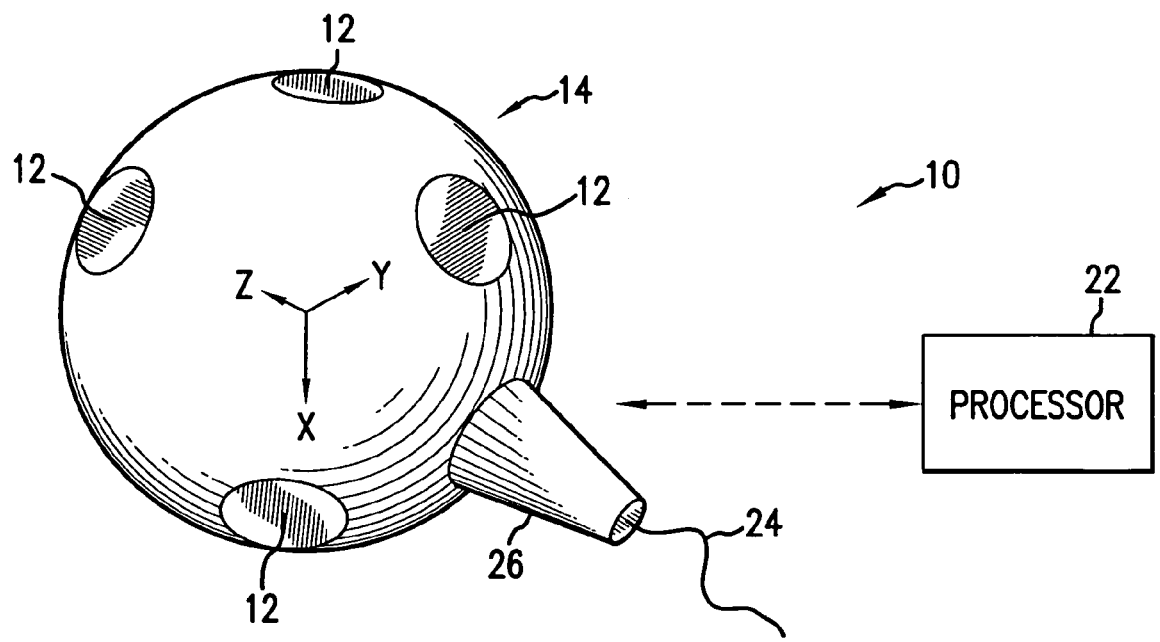
Figure 3B:
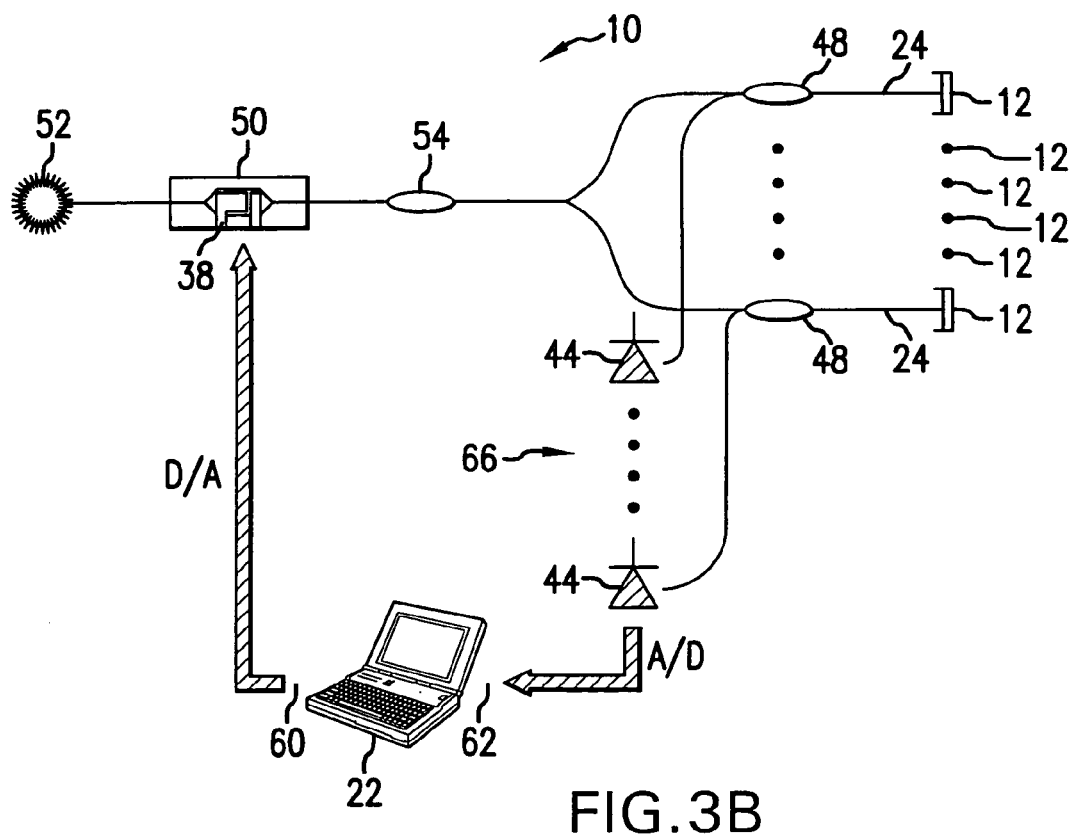

In FIGS. 1A, 2A, and 3A, as well as FIGS. 1B, 2B, and 3B, the one-dimensional, two-dimensional, and three-dimensional pressure gradient sensor system of the present invention are shown, respectively. System 10 includes a pair of sensors 12 for one-dimensional measurements, two pairs of sensors 12 for two-dimensional measurements, and three pairs of sensors 12 for three-dimensional measurements of acoustic parameters, such as pressure gradient, air particle velocity, and acoustic intensity of an acoustic disturbance.

Referring particularly to FIG. 1A, a 1-D spatial sensor includes a supporting member 14 to which a pair of Fabry-Perot sensors 12 are attached at a predetermined distance l one from the other. These sensors 12 are aligned along a single axis, shown as the axis Y in FIG. 1A, and are directed with their front surfaces 16 facing an acoustic field 18 which is to be sensed. The supporting member 14 may be manipulated by a directing member 20 that is controlled either manually or by a processor 22 through a system of mechanical drivers (not shown), which preferably are adaptable for movement of the supporting member 14 in three directions.

A pair of fibers 24 are coupled to the sensors 12 and passed thereto through protective sleeves 26 added for chemical, as well as electromagnetic environmental protection of the system of the present invention.

Referring to FIG. 2A, a two-dimensional sensor of the present invention includes two pairs of sensors 12. The supporting member 14 has a shape which allows each pair of the sensors 12 to be angled one to another. In this particular arrangement shown in FIG. 2A, the supporting member 14 is a cross-like member having a portion 28 and 30 each supporting a respective pair of the sensors 12. In this manner, the pairs of the sensors are orthogonal each to the other. Similar to a one-dimensional sensor system, both sensors 12 are aligned along a single axis (the axis Z extending normally to the supporting member 14), with their front surfaces 16 facing in the same direction, towards the acoustic disturbance 18. Four fibers 24 are used in this two-dimensional sensor, with each fiber being coupled to the respective sensor 12 through the protective sleeve 26. The directing member 20 is attached to the supporting member 14 in order to control the position of the supporting member 14 and as a consequence, the position of the sensors 12 with regard to the acoustic disturbance field 18. The processor 22 is operationally coupled both to the directing member 20 and the fibers 24 in order to both control the position of the sensors 12 and to calculate the acoustic parameters.

With regard to the three-dimensional sensor embodiment, shown in FIG. 3A, the supporting member 14 may be formed as a spherically shaped member, with six sensors 12 arranged on the surface thereof. In such an arrangement, three pairs of sensors 12, each similar to the pair shown in FIG. 1A, are angled with respect to each other preferably normally to each other, to form a three-dimensional structure. Six fibers 24 enter the spherical supporting member 14 through the protective sleeve 26. Within the spherical supporting member 14, each fiber 24 is coupled to the respective sensor 12. In the arrangement shown in FIG. 3A, the front surfaces 16 of the sensors 12 face in different directions in order to provide for three-dimensional sensing of the acoustic disturbance.

FIGS. 1B, 2B, and 3B show respectively in more detailed fashion, block diagrams of the system 10 of the present invention.

It is clear that the system shown in FIG. 1B pertains to the sensor of FIG. 1A, while the block diagram shown in FIG. 2B uses the sensor of FIG. 2A, and wherein the block diagram of FIG. 3B is representation of the system related to the three-dimensional sensor of FIG. 3A.

Figure 4:
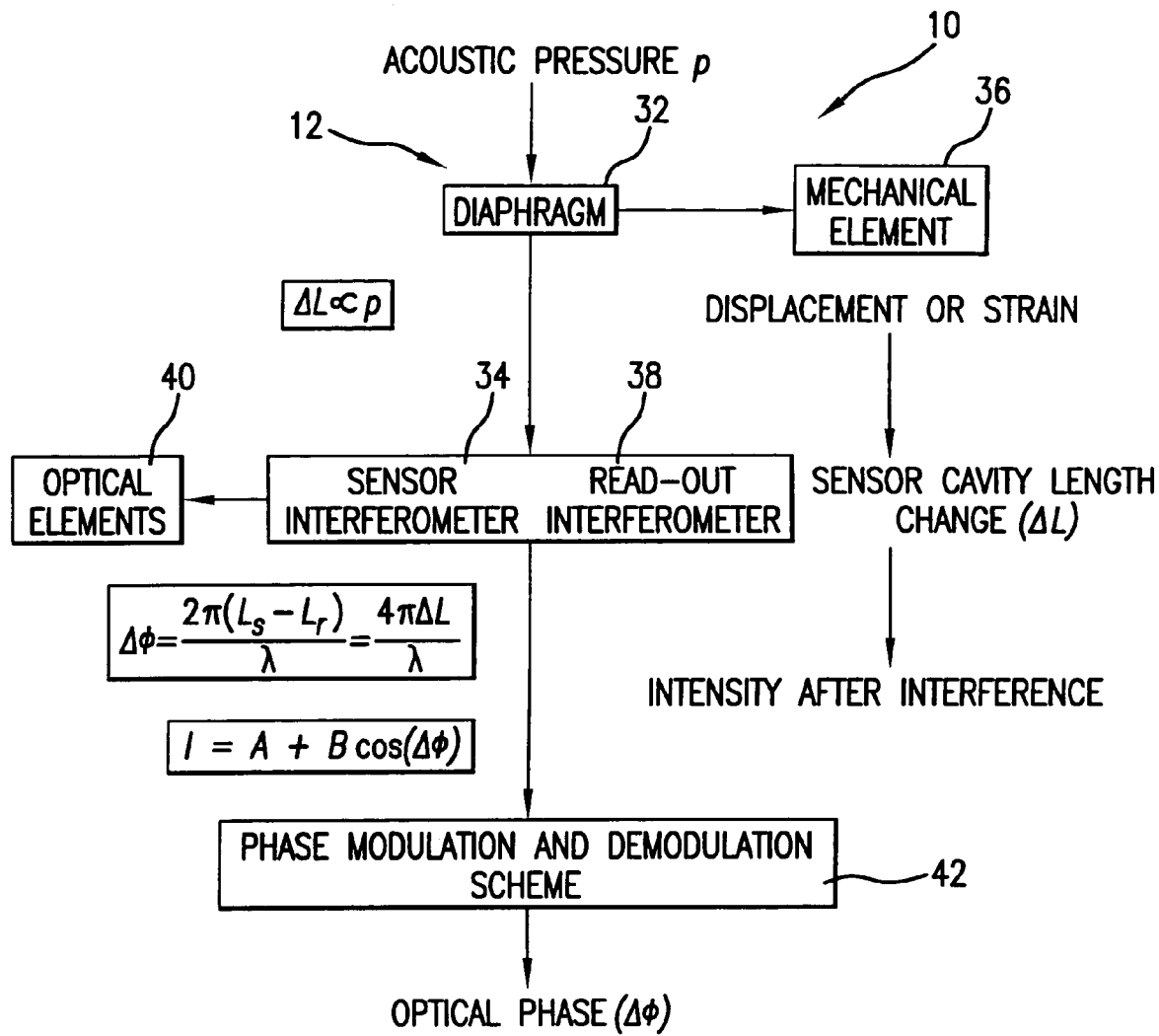
FIG. 4 is a block diagram of the sensor system design for acoustic measurements of the present invention.

Referring to FIG. 4, the sensor system 10 for the acoustic measurements includes sensors 12 each having a diaphragm 32 and a sensor interferometer 34. In order to determine the parameters of a mechanical element 36 which undergoes displacement or strain, the diaphragm 32 of the sensor 12 oscillates under the influence of acoustic pressure p generated by the mechanical element 36. The sensor interferometer 34 is a Fabry-Perot interferometer. The cavity length of the interferometer, $\Delta L$, changes according to diaphragm fluctuations which permits determination of the mechanical element's parameters. Therefore, the cavity length change $\Delta L$ is the parameter which may serve to determine the acoustic pressure p.

A read-out or reference interferometer 38 is path-matched to the sensing interferometer 34 as will be described in detail infra. The cavity length change $\Delta L$ signal is coupled to optical elements 40 which include photodetectors. The received signal (intensity at the output of the photodetectors) is decoded by phase modulation and demodulation scheme 42 to determine the optical phase change $\Delta \phi$ which is a function of $\Delta L$, and thus is related to sound pressure in accordance with a predetermined relationship which may be calculated.

Figure 5A:
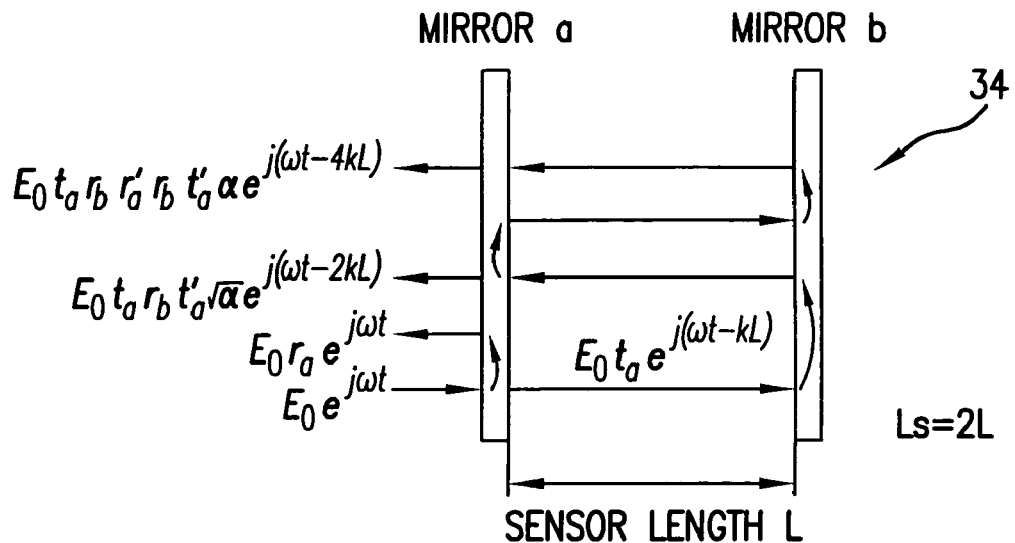
FIGS. 5A and 5B show schematically Fabry-Perot sensor interferometer and Mach-Zehnder read-out interferometer employed in the sensing system of the present invention.

The sensing system 10 of the present invention is based on a low finesse Fabry-Perot (FP) cavity shown in FIG. 5A. After the light emerges from the single mode fiber, the electric field components in the multi-beam interference with Gaussian beam expansion-induced power attenuation may be modeled as:

$$E_{1r} = E_0 r_a e^{j\omega t}, \quad (1)$$

$$E_{2r} = E_0 t_a r_b t'_a \sqrt{\alpha} e^{j(\omega t - 2kL)}, \text{ and}$$

$$E_{3r} = E_0 t_a r_b r'_a r_b t'_a (\sqrt{\alpha})^2 e^{j(\omega t - 4kL)}$$

where
$r_a$ and $r'_a$ are the reflection coefficients of the mirror a, and
$r_b$ and $r'_b$ are the reflection coefficients of the mirror b, respectively, and
$t_a$ and $t'_a$ are the transmission coefficients of the mirror a. It is noted that
$r_a$ and $t_a$ are for waves traveling from glass towards air, while
$r'_a$ and $t'_a$ are for waves traveling from air towards glass. $\alpha$ is the power attenuation factor, which is defined as the fraction of the power coupled back into the single mode fiber after a roundtrip 2L through the FP cavity. The wave number k is equal to $2\pi/\lambda$. The resultant reflected scalar E wave is given by $$E_r = E_0 e^{j\omega t} \sqrt{R_a} \left[ 1 - \frac{1-R_a}{R_a} \sum_{m=1}^{\infty} (-1)^m (R_a R_b \alpha)^{\frac{m}{2}} e^{-2jmkL} \right], \quad (2)$$

where
$r_a = -r'_a = \sqrt{R_a}$ and
$t_a t'_a = T_a$, $r_b = \sqrt{R_b}$,
R and T are reflectivity and transmittivity, respectively.

The transfer function $H_r$ of the Fabry-Perot interferometer may be written:

$$H_r^s = \frac{E_r \cdot E_r^*}{E_i \cdot E_i^*} = A_0 - A_1 \cdot \sum_{m=1}^{\infty} (-1)^m (R_a R_b \alpha)^{\frac{m}{2}} \cdot \cos(2mkL), \quad (3)$$

where:

$$A_0 = R_a + \frac{(1-R_a)^2 R_b \alpha}{(1-R_a R_b)}, \text{ and } A_1 = \frac{2(1-R_a-R_b\alpha+R_a R_b \alpha)}{1-R_a R_b \alpha - 1} \quad (4)$$

For low finesse Fabry-Perot sensor, also referred herein to as FP sensor, the transfer function may be written:

$$H_r^s = A_0 - A_1 \cdot \sqrt{R_a R_b \alpha} \cos(kL_s). \quad (5)$$

Figure 5B:
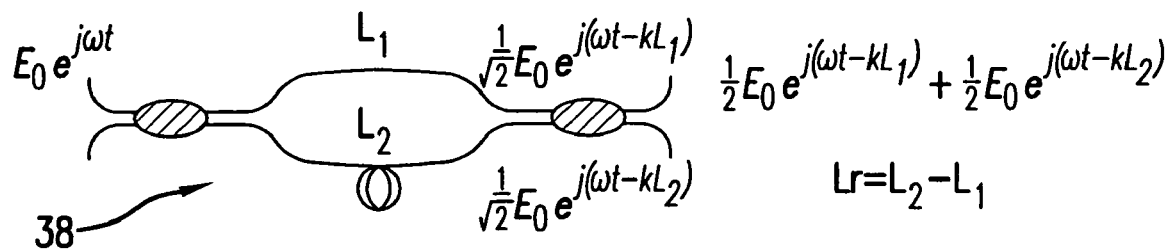

As best shown in FIGS. 1B, 2B, 3B, and 4, a path matched differential interferometry (PMDI) system is designed to demodulate the FP sensor 12. In this PMDI system, the read-out interferometer 38 is path-matched to the sensing interferometer 34. The read-out interferometer 38 may be a Mach-Zehnder interferometer shown in FIG. 5B. Then the associated transfer function is $$H_r^r = \frac{E_r \cdot E_r^*}{E_i \cdot E_i^*} = \frac{1}{2}[1 + \cos k(L_2 - L_1)] = \frac{1}{2}[1 + \cos kL_r], \quad (6)$$

where
$L_r$ is the cavity length of the read-out interferometer 38.
When the light passes through the PMDI system, the resulting time dependent intensity function of the sensors 12, $I_T$, as detected by a photodetector 44 shown in FIGS. 1B, 2B, and 3B, is given by:

$$I_T = \frac{1}{4}\int H_r^r H_r^s i(k) dk, \quad (7)$$

where
$H_r^s$ and
$H_r^r$, which are the transfer functions of the FP sensor interferometer 34 and the Mach-Zehnder read-out interferometer 38 are given by equations (5) and (6), respectively, and
i(k) is the input spectrum of the broadband optical source. After carrying out the integration, equation (7) can be written:

$$I_t \approx \frac{1}{8}I_0 A_0 - \frac{1}{8}I_0 A_1 \sqrt{R_a R_b \alpha} \cos k_0 L_s e^{-\left(\frac{\pi L_s}{L_c}\right)^2} + \frac{1}{8}I_0 A_1 \cos k_0 L_r e^{-\left(\frac{\pi L_r}{L_c}\right)^2} - \frac{1}{16}I_0 A_1 \sqrt{R_a R_b \alpha} \left\{ \cos k_0 (L_s + L_r) e^{-\left[\frac{\pi(L_s+L_r)}{L_c}\right]^2} + \cos k_0 (L_s - L_r) e^{-\left[\frac{\pi(L_s-L_r)}{L_c}\right]^2} \right\}, \quad (8)$$

where
$L_c$ is the coherence length of the short coherence light source and $\Delta\lambda$ represents the half-width of the linewidth. When the system is path matched
($L_r \approx L_s$) and
$L_c$ is much smaller than
$L_r$ and
$L_s$, coherent interference occurs only in the
($L_s - L_r$) component. Thus equation (8) can be simplified:

$$I_t \approx \frac{1}{8}I_0 A_0 - \frac{1}{16}I_0 A_1 \sqrt{R_a R_b \alpha} \cos k_0 (L_s - L_r) \quad (9)$$

In FIGS. 1B, 2B, and 3B, a plurality of fiber tip based Fabry-Perot sensors 12 are provided, having the same cavity spacing with an optical switch 46 to which the fiber tip based Fabry-Perot sensors 12 are coupled by the optical fibers 24. This creates N channels (corresponding to the number of the sensors 12 in the system 10), the signals of which are demultiplexed using the optical switch 46. The system 10 further includes optical couplers 48 which couple photodetectors 44 to the optical switch 46, and the read-out interferometer 38 built-in in the Integrated Optical Circuit (IOC) phase modulator 50. The IOC phase modulator 50, particularly the read-out interferometer 38 portion thereof along with the sensing interferometer 34 of each sensor 12 creates a Path Matched Differential Interferometry (PMDI) system for demodulating signals from the sensors 12.

A Superluminescent Light Emitting Diode (SLD) source 52 generates a light beam for the system 10 of the present invention. Thus, the system 10 of the present invention includes the SLD source 52, the IOC phase modulator 50, N optical couplers 48, 1×N optical switch 46, the FTFP sensors 12, the photodetectors 44, and the processor 22, which may be implemented as a personal computer (PC) based data acquisition system. The advantage of using the optical switch 46 for Spatial Division Multiplexing (SDM) is that a larger number of sensors 12 may be detected by using the same base optical system (i.e., the SLD source 52, photodetectors 44, and the modulator 50). Furthermore, each sensor 12 may be designed to either sense acoustic field at a particular location of the studied system, or to sense a particular acoustic frequency in such a system. An optical coupler 54 couples the IOC phase modulator 50 to the fibers 24 of the sensors 12.

Figure 6:
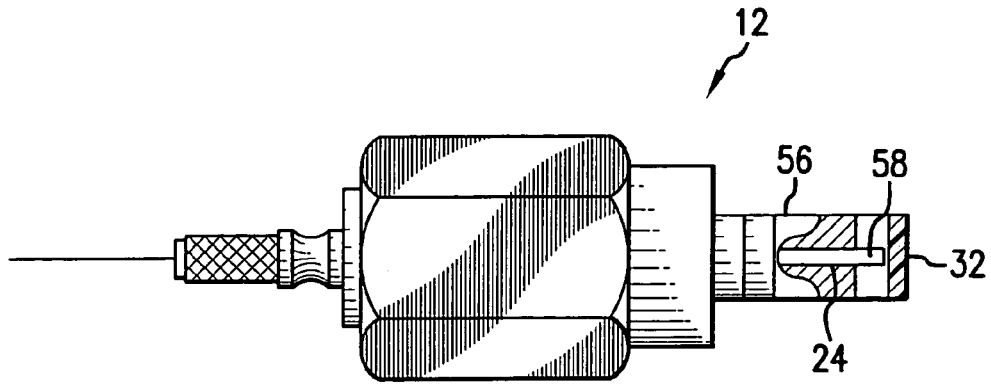
FIG. 6 is an enlarged representation of the sensing element of the present invention.

As shown in FIG. 6, the sensor 12 includes a high reliability connector ferrule 56, a fiber tip 58 passing centrally there through, and a diaphragm 32 (also schematically shown in FIG. 4). The diaphragm 32 may be formed of a Mylar™, a polyester film, with a thickness, for example, of 40 microns and a radius of, for example, 1.75 mm. The single mode fiber 24 which is fixed centrally in the connector ferrule 56, has the fiber tip 58 spaced from the diaphragm 32 by approximately 60 microns, which is half of the imbalance length in the IOC phase modulator 50. Fiber tip 58 is coated with the TiO2 film through a SOL-GEL process for example, which is used to form the TiO2 mirror on the entire cross-section of the optical fiber 24 in order that the reflectivity of the fiber tip 58 may be increased up to 30%. An alternate means for coating the fiber tip can be based on vapor deposition techniques.

The sensor diaphragm 32 is considered as a circular plate membrane system with a fixed edge. The relationship between the displacement of the diaphragm 32 and the pressure experienced by the diaphragm 32 is determined as follows:

For an isotropic circular plate of radius a and thickness h, the first natural frequency of the diaphragm may be written:

$$f = \frac{10.21}{2\pi a^2}\left[\frac{Eh^2}{12\rho(1-v^2)}\right]^{1/2} \quad (10)$$

For forced oscillations, the governing equation is of the form:

$$D\nabla^4 w + \rho h \frac{\partial^2 w}{\partial t^2} - N_0 \nabla^2 w + \text{damping term} = p(r, \theta; t) \quad (11)$$

where
$p(r,\theta;t)$ is the dynamic sound pressure to be sensed with amplitude of p,
$\rho$ is density of the diaphragm material,
$v$ is Poisson ratio,
$N_0$ is the initial plate tension, and $$D = \frac{Eh^3}{12(1-v^2)}.$$

The solution of equation (11) may be written as:

$$w(r, \theta, t) = \sum_{k=0}^{\infty} \eta_k(t) W_K(r, \theta), \quad (12)$$

where
$\eta_k$ are the modal amplitudes and
$W_k$ are the mode shapes determined from the free-vibration problem. Taking advantage of the orthogonality of the modes, for a harmonic loading, equation (11) is reduced to:

$$\ddot{\eta}_k + 2\zeta_k \omega_k \dot{\eta}_k + \omega_k^2 \eta_k = F_k f(t), \quad (13)$$

where $\omega_k$ is the natural frequency of the kth mode of interest and $\zeta_k$ is associated the modal damping coefficient; the different coefficients in equation (13) are given by $$\zeta_k = \frac{\mu}{\rho h \omega_k}, F_k = \frac{1}{\rho h N_k} \int_0^a p W_k(r,\theta) 2\pi r dr, \text{ and} \quad (14)$$

$$N_k = \int_0^a 2\pi r W_k^2(r,\theta) dr$$

For harmonic excitation, the solution of equation (13) may be written:

$$\eta_k = \hat{\ }_k e^{j(\omega t - \phi k)}, \quad (15)$$

where the amplitude function is calculated as:

$$\wedge_k = \frac{F_k}{\omega_k^2 \sqrt{\left[1 - \left(\frac{\omega}{\omega_k}\right)^2\right]^2 + 4\zeta_k^2 \left(\frac{\omega}{\omega_k}\right)^2}} \quad (16)$$

Approximating the response given by equation (12) in terms of a single mode, here, the displacement response amplitude is written:

$$w(r,\theta) = \hat{\ }_0 W_0(r,\theta), \quad (17)$$

where $$W_0(r,\theta) = A[J_0(kr)I_0(ka) - I_0(kr)J_0(ka)] \quad (18)$$

From equations (14) to (18), the displacement response is determined to be $$w(r,\theta) = \frac{2\pi P a}{\rho h \overline{N}_\theta k} \frac{[J_1(ka)I_0(ka) - I_1(ka)J_0(ka)]}{\omega_k \sqrt{\left[1 - \left(\frac{\omega}{\omega_k}\right)^2\right]^2 + 4\zeta_k^2 \left(\frac{\omega}{\omega_k}\right)^2}} \quad (19)$$

where:

$$\overline{N}_\theta = \int_0^a 2\pi r [J_0(kr)I_0(ka) - I_0(kr)J_0(ka)]^2 dr \quad (20)$$

For a FTFP sensor, the cavity length change is due to the deflection of the diaphragm center $w_0$. Hence, the optical phase change $\Delta\phi$ is related to the sound pressure as $$\Delta\varphi = \frac{4\pi}{\lambda} w(r,\theta) \quad (21)$$

-continued $$= \frac{8\pi^2 P a}{\lambda \rho h \overline{N}_\theta k}$$

$$\frac{[J_1(ka)I_0(ka) - I_1(ka)J_0(ka)][I_0(ka) - J_0(ka)]}{\omega_k \sqrt{\left[1 - \left(\frac{\omega}{\omega_k}\right)^2\right]^2 + 4\zeta_k^2 \left(\frac{\omega}{\omega_k}\right)^2}}$$

where λ is the wavelength of light source. For a complete analysis, refer to the dissertation of Yu, M. (2002). "Fiber Optic Systems for Acoustic Measurements," University of Maryland, College Park.

The above equation (21) is used to describe how the sound pressure deflects the diaphragm and how this resulting deflection produces an optical phase change in the FTFP sensor. To extract the phase from the optical sensor output, the phase demodulation system 42, shown in FIG. 4, which includes the IOC phase modulator 50 is employed.

Equation (21), reflects the fact that a compromise between the bandwidth and sensitivity is required. For a particular diaphragm material, the upper frequency limit may be increased by increasing the thickness "h" of the diaphragm or by decreasing the radius "a". However, an increase of "h" or a decrease in "a" reduces the displacement w(r,θ) and thus reduces the sensitivity of the diaphragm. To measure the pressure gradient, it is desirable to have the diaphragm size as small as possible to obtain adequate resolution and accuracy. For example, a diaphragm with a radius of 3 mm and a thickness of 4.0 microns may be chosen.

The phase modulation-demodulation system 42 shown in FIG. 4 implemented for the current sensor design, is a PC-based pseudo-heterodyne scheme based on a four-step phase-stepping algorithm. In this scheme, the optical signal generated by the SLD source 52 is modulated by the IOC phase modulator 50 instead of a traditional PZT modulator. This technique offers numerous advantages: a) high optical output power, b) large frequency range (up to 3 GHz), c) rejection of electrical noise, d) high dynamic range, and e) very high stability.

The modulation signal which is a discrete sawtooth wave is generated from the digital-to-analog output 60 of the PC 22. In every period of the modulation signal, four digital voltages are generated and used to drive four step modulated phase values from the IOC phase modulator 50 based on a calibration curve. Subsequently the modulated phases are added to the sensor phase change. The combined phase signal is detected by the high speed photodetector 44 and sent to the analog-to-digital input 62 of the PC 22. The modulation frequency used is 100 kHz and the depth of modulation is approximately $3\pi/2$.

In order to demodulate the received signal, the optical intensity detected by the sensors 12 is sampled four times during each period of the modulation signal. A 12-bit National Instruments digital acquisition board is then triggered to record the intensity every $\pi/2$ radians of the modulation signal. When the depth of modulation is set to $3\pi/2$ and the sampling rate is synchronized with the modulation frequency, the four consecutive optical intensity measurements yield the following:

$$I_0 = A + B\cos(\Delta\phi_s + 0) = A + B\cos(\Delta\phi_s), \quad (22)$$

$$I_1 = A + B\cos\left(\Delta\phi_s + \frac{\pi}{2}\right) = A - B\sin(\Delta\phi_s),$$

-continued
$$I_2 = A + B\cos(\Delta\phi_s + \pi) = A - B\cos(\Delta\phi_s),$$
$$I_3 = A + B\cos\left(\Delta\phi_s + \frac{3\pi}{2}\right) = A + B\sin(\Delta\phi_s).$$

The sensor phase is then determined from these four intensity values by using the following arc-tangent function:

$$\Delta\phi_s = \tan^{-1}\left(\frac{I_3 - I_1}{I_0 - I_2}\right). \quad (23)$$

Equation (23) provides a way to determine the phase signal the user is trying to detect. However, care has to be taken, whenever the denominator in equation (23) passes through a zero. Since, the inverse tangent function is multi-valued, the unwrapping algorithm, is written to detect this discontinuity, and either an addition or subtraction of a phase of $\pi$ from $\Delta\phi_s$ is carried out to maintain a continuous phase. The advantage of this algorithm is that the modulation frequency can be much higher than that used in the other techniques and the phase error is relatively low.

An experimental sensor system based on Fabry-Perot principles shown in FIGS. 1A-4 has been built. The system consists of the SLD source 52, optical couplers 48 and 54, the FTFP sensors 12, an IOC phase modulator 50, photodetectors 44, and a data acquisition personal computer 22. The Fabry-Perot cavity is produced between the fiber tip 58 and a diaphragm structure 32. The frequency response range of the diaphragm structure 32 extends to 10 kHz. Light from the SLD 52 is initially sent to the IOC phase modulator 50, and then via the couplers 54 and 48 to the FTFP sensor 12.

The reflected light from each FTFP sensor 12 is then sent to the respective high speed photodetector 44. The Mach-Zehnder interferometer 38 internal to the IOC phase modulator 50 is path-matched to the FTFP sensors 12 to act as a read-out interferometer. The path matching is accomplished by moving a micro-stage (not shown) to adjust the distance between the fiber tip 58 and the diaphragm 32. The IOC phase modulator 50 is driven by the four step phase stepping algorithm described supra at a very high frequency (100 kHz).

In the application system run, a condenser microphone (Bruel & Kjaer model #4134) was used as reference sensor for validation. The input acoustic signal was generated by an Altec Lansing computer speaker system (Model No. ACS340). The diaphragm 32 of the FTFP sensors 12 was excited by using the speaker. The vibration changes the distance between the fiber tip 58 and the diaphragm 32 which is related to the optical phase change. In order to detect this unknown phase change, the phase demodulation algorithm described supra was employed. The entire phase modulation and demodulation process was controlled by a PC-based digital signal processing program.

The acoustic sensor 12 was operated in a frequency range of approximately 50 Hz to 7.5 kHz by using sinusoidal sound signals. The sensor results have been compared to the results of a Bruel & Kjaer 4134 condenser microphone, and it was demonstrative of the applicability of the FTFP sensor system of the present invention for acoustic measurements. The studies show that the system can be used in the frequency range from 50 Hz to 7.5 kHz.

The data output from the photodetectors are processed in the PC 22 in accordance with the following sequence of steps:
 a. Analog-to-digital conversion;
 b. Data manipulation;
 c. Phase extraction;
 d. Phase unwrapping; and
 e. Digital-to-analog conversion.

In the step (a), the analog signals output from the photodetectors 44 are digitized in the PC 22 by using dSPACE, where it becomes accessible to MATLAB SimuLink and dSPACE ControlDesk programs (16-bit conversion is used). The digitized data corresponding to the photodetector output is fed in the step (b) into a 4-bit register for use by the phase extraction module. In step (c), the phase is extracted by utilizing the 4-step phase modulation scheme. (Arc Tangent function is used.) Further, in step (d), the discontinuity of the Arc Tangent function (at ±90°) is resolved and the extracted phase is unwrapped to reflect the values corresponding to the pressure loading on the sensor diaphragm 32. In the D-to-A conversion step (e), the digital values of the phase are converted into their analog corresponding values (16-bit conversion is used). The processing of the data is similar for each sensor 12 in the sensor system 10 of the present invention.

Operational results have shown that the sensor system of the present invention is able to capture the acoustic field with an acceptable accuracy and confirm model predictions.

As disclosed supra, the fiber-tip based Fabry-Perot sensors may be used for detecting and measurements of acoustic pressure and further may serve as a microphone. Noise is transmitted into the enclosure through a flexible boundary, and the fiber tip sensors of the present invention sense and permit measurement of the acoustic pressure both inside and outside the enclosure.

The fiber optic sensors of the present invention, shown in FIGS. 1A-4, may be used for active acoustics control as pressure gradient sensors, air particle velocity sensors, and acoustic intensity sensors. Each pressure gradient sensor as shown in FIGS. 1A, 2A, and 3A, includes one, two or three pairs of the fiber tip Fabry-Perot (FTFP) sensors 12, whose axes are aligned and front faces are oriented in the same direction in each pair. The sensors signals are acquired through the PC interface 22. Both sensors 12 are multiplexed on the input side of the system 10, and they share the same light source 52 and the reference sensor (not shown). The signals can be conditioned on-line or off-line to determine the pressure gradient, and from the pressure gradient to calculate the air-particle velocity, and further, the acoustic intensity.

In the fiber tip pressure gradient, velocity and acoustic intensity sensor of the present invention shown in FIG. 3A, six pressure microphones (based on fiber tip Fabry-Perot sensors) are mounted on the sphere of a predetermined radius and a finite difference scheme is used to predict the air particle velocity from the pressure measurement made by fiber tip based Fabry-Perot sensors of the present invention. This type of arrangement of the fiber tip sensor of the present invention permits greater flexibility since "small size" microphones (fiber based Fabry-Perot sensors of the present invention) have high sensitivity and are not susceptible to interference effects. This sensor includes two fiber tip microphones of the present invention disclosed supra in each direction of the XYZ coordinate system.

Figure 7A:
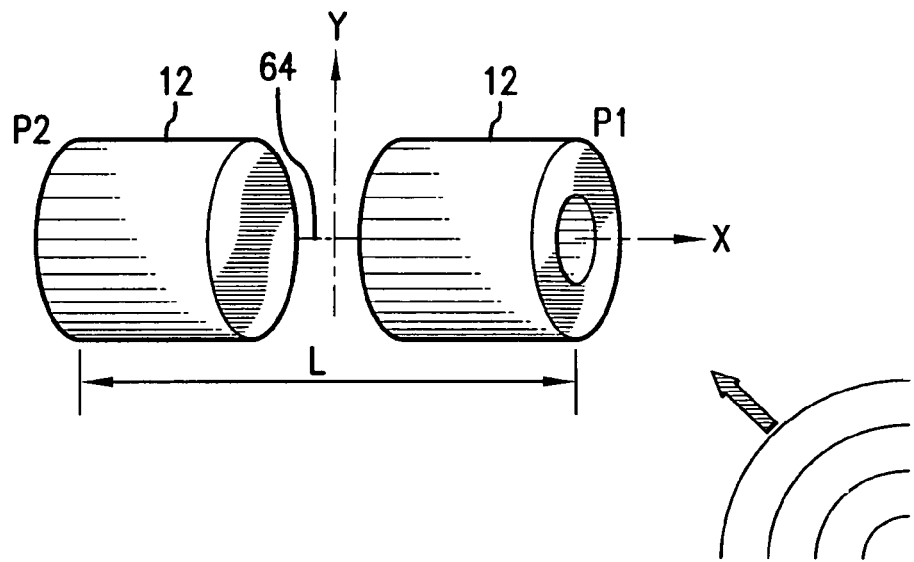
FIGS. 7A and 7B are simplified schematic representations of the sensor of the present invention showing sensor locations with respect to a disturbance field that is to be sensed (FIG. 7A), and showing the directional sensitivity for the pressure gradient measurements (FIG. 7B)
Figure 7B:
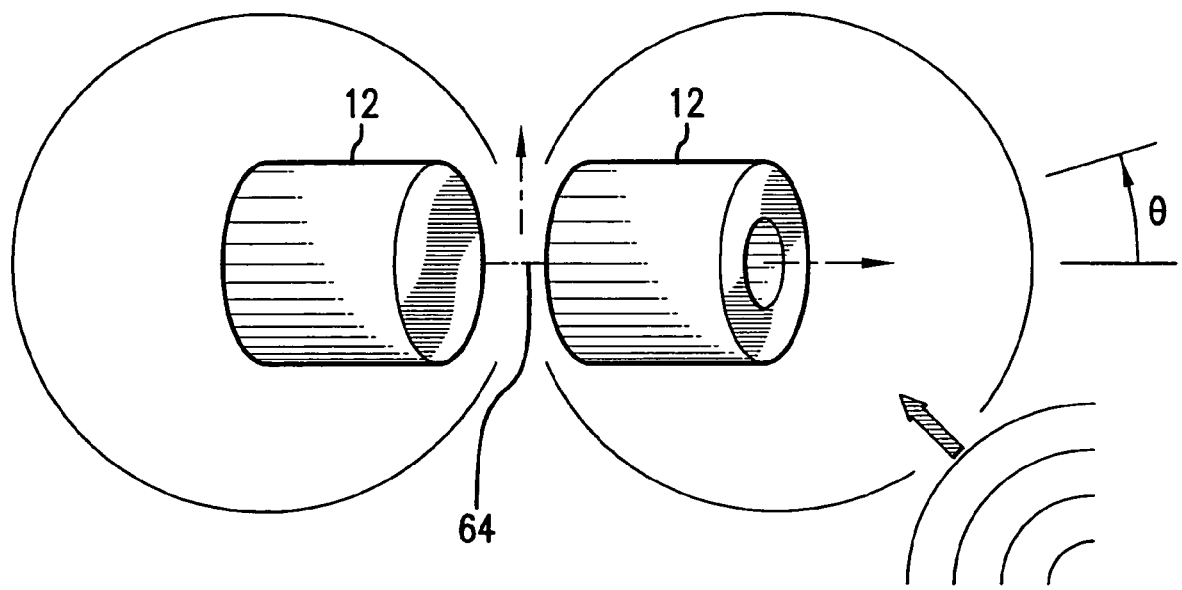

As shown in FIGS. 7A and 7B, illustrating a simplified model of the sensor system of the present invention, two pressure sensors 12 are positioned in the direction X with the center point 64 of the velocity sensor system coincident with the origin of the XY coordinate system.

For one-dimensional wave propagation, the governing equation is given by:

$$\frac{\partial p(x,t)}{\partial x} = -\rho_0 \frac{\partial u(x,t)}{\partial t} \quad (24)$$

where p(x,t) and u(x,t) are, respectively, the pressure and air particle velocity at point x and time t, and $\rho_0$ is the medium mass density.

The pressure at the center point 64 between two FTFP sensors spaced a distance "l" apart is calculated by the processor 22 as the mean value of the pressures at the two microphones 12 as:

$$p(0,t) = (p(l/2,t) + p(-l/2,t))/2 \quad (25)$$

In order to construct the sensor system, the partial differential equation may be simplified by using finite difference schemes. Assuming that the distance between the two pressure microphones 12 along the x-axis is l and the velocity is sampled at time intervals δt, if a second order central finite difference scheme is used for the spatial differentiation and a second order forward scheme is used for the time differentiation, Eq. (24) can be approximated in the following form:

$$\frac{p(l/2,t) - p(-l/2,t)}{l} = -\rho_0 \frac{3u(0,t) - 4u(0,t-\delta t) + u(0,t-2\delta t)}{2\delta t} \quad (26)$$

where the left portion of the Eq. (26) represents a Pressure Gradient. Since the FTFP sensors are electrically passive, they can be placed close to each other without encountering the problems faced with the condenser microphones that are not electrically passive. From the Eq. 26, the air particle velocity at the origin is determined to be:

$$u(0,t) = \frac{1}{3}\left[4u(0,t-\delta t) - u(0,t-2\delta t) - \frac{2\delta t}{\rho_0 l}[p(l/2,t) - p(-l/2,t)]\right] \quad (27)$$

These two finite difference schemes are chosen since they have errors of order $O(l^2)$ and $O(\delta t^2)$, respectively. In order to examine the error associated with the chosen schemes, the following analysis is carried out. Consider an incident wave at an angle θ with respect to the x-axis as shown in FIG. 7B. The pressure magnitudes at the pressure microphones 12 located at (−l/2) and (l/2) are, respectively:

$$p\left(-\frac{l}{2},t\right) = Pe^{j(\omega t + \frac{kl}{2}\cos\theta)} \quad (28)$$

$$p\left(\frac{l}{2},t\right) = Pe^{j(\omega t - \frac{kl}{2}\cos\theta)}$$

where k is the wave number (k=ω/c) and c is the sound speed in the medium. In these equations, the wave component parallel to the diaphragm plane (ky sin θ) is neglected. This is acceptable for ka<<1, where a is the diameter of the diaphragm. Making use of Eqs. (28) on the left-hand side of Eq. (26) it is found:

$$\frac{p\left(\frac{l}{2},t\right) - p\left(-\frac{l}{2},t\right)}{l} = \frac{P}{l}e^{j\omega t}\left[j2\sin\left(\frac{kl}{2}\cos\theta\right)\right] \quad (29)$$

For a small incident angle and low frequency values (kl<1), this equation becomes, $$\frac{p\left(\frac{l}{2},t\right) - p\left(-\frac{l}{2},t\right)}{l} \approx jkP\cos\theta e^{j\omega t} \quad (30)$$

The exact solution for the pressure at point x due to the incident wave is $$P(x,t) = Pe^{j(\omega t + x\cos\theta)} \quad (31)$$

whose first derivative, when evaluated at the origin is:

$$\left.\frac{\partial p(x,t)}{\partial x}\right|_{x=0} = jkP\cos\theta e^{j\omega t} \quad (32)$$

This equation is identical to that obtained from the finite difference approximation scheme.

It should be noted that as kl increases, not only does the relative error increase, but other sources of error must also be considered. There exist errors associated with diffraction of sound waves, errors associated with neglecting the wave component parallel to the diaphragm plane (ky sin θ), and errors associated with the relative orientations of the pressure microphones relative to each other.

In particular, these kinds of errors increase in magnitude dramatically as the wave frequency increases. The assumption of plane wave approximation is then no longer valid as one gets closer to the sound source (which corresponds to small values of kl), and relationships must be derived based on spherical wave considerations. In this type of situation, the relation of particle velocity to pressure is:

$$\frac{U}{P} = \frac{1}{\rho_0 c \cos\theta}; \quad \cos\theta = \frac{kr}{\sqrt{1+(kr)^2}} \quad (33)$$

where r represents the distance from the source to the point of interest. This relationship is simply the reciprocal of the specific acoustic impedance of the medium.

After determining the pressure p(0,t) and the air particle velocity u(0,t) at the center point 64 of the sensor system, the acoustic intensity I(0,t) can be calculated by the processor 22 in accordance with:

$$I(0,t) = p(0,t) \cdot u(0,t) \quad (34)$$

The sensor system of the present invention was tested which was arranged as a multiplexed fiber tip based Fabry-Perot sensing system shown in FIGS. 1B, 2B, and 3B. In this implementation, two fiber tip microphones (or sensors) 12 were aligned in each direction of the xyz coordinate system. For each of the FTFP sensors 12, there was an optical coupler 48 through which each sensor 12 was coupled to a respective photodetector 44 from the photodetector array 66. The output of the detectors 44 were coupled to the A-D input of the PC 22 and the coupler 54 was connected to the IOC phase modulator 50 with the read-out interferometer 38 built therewithin. The calculations were performed by the PC 22 in accordance with the equations (24-34) supra.

For the sensor system of the present invention, the separation 1 between the two pressure microphones 12 was chosen to be 25.0 mm. The finite difference approximation of equation (27) was computed digitally by the PC 22. An identical pressure microphone (the FTFP sensor) was set exactly at the midpoint between the two pressure microphones (sensors) 12 to conduct the energy measurements. All the FTFP sensors (or the pressure microphones) had the same orientation; that is 90 degrees relative to the incident wave. The wave (acoustic disturbance) 18 was generated by using a commercial speaker that was located 348.0 mm away from the microphone in the middle of the measurement scheme. With this distance consideration, the value kr is approximately 10.0 at the excitation frequency of 1.5 kHz. Other orientations of the sensors have also been analyzed since orientation of the pressure microphones (sensors) is important at high frequencies.

However, for this particular arrangement, the study showed that this effect is negligible up to about 850 Hz. The sensor system has been examined experimentally in the frequency range 30.0 Hz to 2.0 kHz. The measurements of the sensor system were normalized such that at the excitation frequency of 1.5 kHz, the amplitude of the sensor system is the same as the amplitude of the pressure sensor located in the middle. The results from studies performed at 30.0 Hz and 1.0 kHz have shown that the output of the sensor system of the present invention increases as the excitation frequency decreases.

In summary, a fiber-optic sensor system has been developed for acoustic measurements over a 6 kHz bandwidth. Higher bandwidths can be realized by changing the sensor diaphragm geometry and tension in this diaphragm. The design of the sensor system of the present invention permits multiplexity on the input side of the system which is an important feature of the system of the present invention. This feature permits the design of the sensor so that it can be the basis for acoustic and density measurements, particularly, as a pressure gradient and air particle velocity as well as acoustic intensity sensor.

The subject novel optical system design is based on low coherence fiber-optic interferometry techniques which has a sensor interferometer (Fabry-Perot interferometer, the cavity of which is formed between the tip of the fiber and the studied object) and a read-out interferometer (which is a Mach-Zehnder interferometer) built in the integrated optical circuit phase modulator. This permits a high dynamic range and makes the system less sensitive to the wavelength fluctuation of the light source and the optical intensity fluctuations. Furthermore, the use of this interferometry technique makes it possible to realize phase modulation for sensors with "small" cavity lengths which is important for "small" scale sensors.

For each FTFP sensor used in the experiments, the diaphragm diameter was ~4.0 mm, the outer housing diameter was ~6.5 mm, and the housing length was in the order of 14.0 mm. In the pressure gradient measurements, these sensors have been tried with two different spacings, for example, with the separation of 10 mm and 25 mm between the sensors. The arrangement of two FTFP sensors for pressure-gradient measurements can be enclosed in a 1.5"×1.5"×0.5" rectangular package.

In the sensor's fabrication, a tensioned diaphragm is used as the transducer which makes it possible to realize both high sensor bandwidth and high sensitivity simultaneously. A high reliability fiber connector is used and modified to be the sensor housing in order that the durability and accuracy of the sensor is improved. The fiber tip is coated with $TiO_2$ film or polished appropriately, so that this tip serves as a partial mirror of a Fabry-Perot cavity. Through this fabrication, the reflectivity of the fiber tip is increased from 4% to about 30%. The visibility in the signal-to-noise ratio of the sensor signal is greatly improved.

A novel digital phase modulation and demodulation scheme is developed by taking advantage of an integrated optical circuit (IOC) phase modulator and further by using the multi-step phase-stepping algorithm. This scheme permits high frequency real time phase signal demodulation without using any demodulation hardware, active control elements, or multiple interferometers that are necessary for existing demodulation techniques.

The sensor system 10 of the present invention can be used for near-field measurements as it is very sensitive near the acoustic sources since it "sees" a spherical wave rather than a plane wave, and the pressure gradient sensor is more sensitive to such a wave.

The sensor system of the present invention is well-suited as a directional microphone. The directivity of the 1-D pressure gradient sensor system 10 of the present invention, is presented by Eq. (35).

$$R_{PG}(\theta) = \sin\left(\frac{kl}{2}\cos\theta\right) / \sin\frac{kl}{2} \qquad (35)$$

and is illustrated in FIG. 8A. As it is seen, the directivity of such a pressure gradient sensor system having a pair of sensors 12, is bidirectional, as it shows two lobes—one on the top and another on the bottom of the graph of FIG. 8A. When the air particle velocity directionality (i.e., that determined from a pressure gradient calculation as presented supra) is combined in series with the directionally for pressure measurements, a cardiod shape is obtained, as illustrated in FIG. 8B. Microphones with cardiod shaped directivity are unidirectional microphones, as they are sensitive to sound waves coming from just one direction. The directivity of a directional microphone is presented by Eq. 36.

$$R_D(\theta) = 1 + \cos\theta \qquad (36)$$

Therefore, with a pair of FTFP sensors, one can design the unidirectional microphone by making use of the pressure and the pressure gradient measurements.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of the elements may be reversed or interposed, all without departing from the spirit or scope of the invention as defined in the appended claims.

What is claimed is:

1. A fiber optic sensor system for measuring pressure gradient, air particle velocity and acoustic intensity of an acoustic disturbance, comprising:
at least a pair of substantially identical sensors, each sensor including a diaphragm and a sensing fiber-tip based interferometer having a Fabry-Perot cavity formed between said fiber tip and said diaphragm, said fiber tip and said diaphragm both being optically reflective to form a pair of reflective surfaces of said interferometer, said pair of the sensors being spaced one from the other along a first axis with said diaphragms being oriented in a common direction, the acoustic disturbance deflecting said diaphragm of each said sensor; and
a processor operationally coupled to said at least a pair of sensors for calculating pressure gradient, air particle velocity and acoustic intensity of an acoustic field based on the deflection of said diaphragms affected by the acoustic field.

2. The fiber optic sensor system of claim 1, wherein said processor calculates the pressure gradient based on measurements of acoustic pressure sensed by said pair of sensors, as $$\text{Pressure Gradient} = \frac{p(l/2, t) - p(-l/2, t)}{2}$$

wherein
p(±l/2,t) is the dynamic sound pressure to be sensed by said sensors at respective locations l/2 and −l/2 thereof;
l is a distance between said sensors; and
t is a time of taking measurements.

3. The fiber optic sensor system of claim 2, wherein said processor calculates air particle velocity as $$u(0, t) = \frac{1}{3}\left[4u(0, t - \delta t) - u(0, t - 2\delta t) - \frac{2\delta t}{\rho_0 l}[p(l/2, t) - p(-l/2, t)]\right]$$

wherein
u(0,t) is an air particle velocity,
δt is time between two measurements,
$\rho_0$ is the medium mass density.

4. The fiber optic sensor system of claim 3, wherein said processor calculates the acoustic intensity as $$I(0,t)=p(0,t)\cdot u(0,t),$$

wherein p(0,t) is the sound pressure at the center between said sensors, and u(0,t) is the air particle velocity.

5. The fiber optic sensor system of claim 1, comprising at least one additional pair of said sensors, each sensor of said additional pair of sensors being spaced one from the other along another axis, said other axis being disposed in angled relationship with respect to said first axis.

6. The fiber optic sensor system of claim 1, comprising a supporting member, said at least one pair of said sensors being attached to said supporting member at a predetermined distance l one sensor from the other sensor,
at least a pair of optical fibers, each optical fiber being coupled to a respective one of said sensors, and
a directing member attached to said supporting member to direct said fiber optic sensor system towards the acoustic field.

7. The fiber optic sensor system of claim 1, further comprising:
a light source,
an Integrated Optical Circuit (IOC) phase modulator coupled to said light source to modulate the light generated from said light source,
a read-out interferometer built in said IOC phase modulator, said read-out interferometer being path-matched to said sensing fiber-tip based interferometer of each of said at least a pair of said sensors,
at least a pair of photodetectors, each photodetector being coupled to a respective one of said at least a pair of said sensors, and
a phase modulation-demodulator coupled to said IOC phase modulator and said at least a pair of the photodetectors for modulating said light beam in said IOC phase modulator in accordance with a multi-step phase-stepping pattern, and for demodulating data obtained from said at least a pair of the photodetectors in synchronism with said multi-step phase-stepping pattern,
wherein said processor is coupled to said phase modulation-demodulation means for controlling said multi-step phase-stepping pattern and for calculating phase signals of said at least a pair of said sensors based on said obtained data.

8. The fiber optic sensor system of claim 7, further comprising an optical switch coupled between said JOG phase modulator and said at least a pair of said sensors for multiplexing an input side of said fiber optic sensor system.

9. The fiber optic sensor system of claim 1, further including a $TiO_2$ fiber coating on said fiber tip.

10. The fiber optic sensor system of claim 2, wherein said processor calculates the acoustic pressure based on the optical phase change of an output signal of said at least a pair of said sensors.

11. The fiber optic sensor system of claim 1, wherein said diaphragm is formed of polyester film.

12. The fiber optic sensor system of claim 1, wherein each of said at least a pair of said sensors includes a high reliability connector ferrule, said fiber passing longitudinally through said connector ferrule.

13. The fiber optic sensor system of claim 1, wherein the distance between said fiber tip and said diaphragm is selectively adjustable.

14. A method for forming a fiber optic sensor system for measuring pressure gradient, air particle velocity and acoustic intensity of an acoustical disturbance, the method comprising the steps of:
providing a pair of substantially identical sensors each said sensor including a diaphragm and a sensing fiber-tip based interferometer having a Fabry-Perot cavity formed between said fiber tip and said diaphragm, said fiber tip and said diaphragm both being optically reflective to form a pair of reflective surfaces of said interferometer;
spacing each of said pair of said sensors one from the other along a first axis;
coupling a processor to said pair of said sensors;
calculating pressure gradient, air particle velocity and acoustic intensity based on the deflection of said diaphragms subjected to the acoustic disturbance
outputting the calculated pressure gradient, air particle velocity and acoustic intensity.

15. The method of claim 14, wherein the step of spacing said pair of said sensors is followed by the steps of providing at least one additional pair of said sensors; spacing each said additional sensor one from the other along another axis, said other axis being angled with respect to said first axis.

16. The method of claim 14, further comprising the steps of:
attaching said pair of said sensors to a supporting member a predetermined distance l one sensor from the other sensor, and
coupling an optical fiber to each said sensor.

17. The method of claim 14, further comprising the steps of:
generating a light beam from a light source;
modulating the light beam generated from said light source by means of an Integrated Optical Circuit (IOC) phase modulator coupled thereto, said IOC phase modulator including a read-out interferometer built therein, said read-out interferometer being path-matched to said sensing fiber-tip based interferometer of each of said pair of said sensors;
coupling a photodetector to each said sensor;
coupling a phase-modulation-demodulation means to said IOC phase modulator and a pair of said photo detectors;
modulating said light beam in said IOC phase modulator by means of said modulation-demodulation means in accordance with a multi-step phase-stepping pattern;
demodulating data obtained from said pair of said photodetectors in synchronism with said multi-step phase-stepping pattern; and
coupling said processor to said phase modulation-demodulation means for controlling said multi-step phase-stepping pattern and for calculating phase signals of said pair of said sensors based on said obtained data.

18. The method of claim 17, further comprising the steps of:
coupling an optical switch between said JOG phase modulator and said pair of said sensors, and
multiplexing an input side of said fiber optic sensor system.

19. The method of claim 14, further comprising the step of:
adjusting the distance between said fiber tip and said diaphragm.

20. The method of claim 15, further comprising the step of:
arranging three said pairs of said sensors on a surface of a spherical supporting member for three-dimensional measurements.

21. A fiber optic sensor system for measuring pressure gradient, air particle velocity and acoustic intensity of an acoustic disturbance, comprising:
at least a pair of substantially identical sensors, each sensor including a diaphragm and a sensing fiber-tip based interferometer having a Fabry-Perot cavity formed between said fiber tip and said diaphragm, said fiber tip and said diaphragm both being optically reflective to form a pair of reflective surfaces of said interferometer, said pair of said sensors being spaced one sensor from another along a first axis with said diaphragms being oriented in opposing directions, the acoustic disturbance deflecting said diaphragm of each said sensor; and
a processor operationally coupled to said pair of said sensors for calculating pressure gradient, air particle velocity and acoustic intensity of an acoustic field based on the deflection of at least one of said diaphragms affected by the acoustic field.

22. The fiber optic sensor system of claim 21, further comprising at least one additional pair of said sensors, each sensor of said additional pair of said sensors being spaced one from the other along another axis, said other axis being disposed in angled relationship with respect to said first axis.

* * * * *